Figure 1:
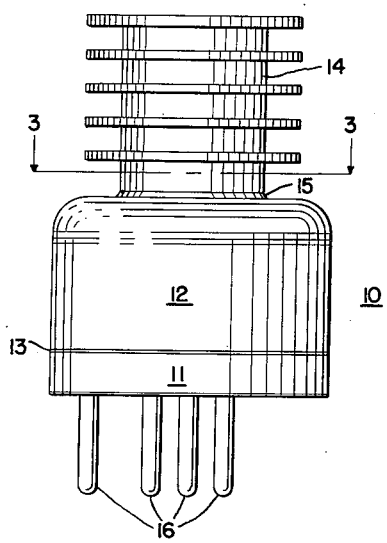

May 8, 1962 R. F. HOCHMAN 3,032,869
METAL-CERAMIC SEAL
Original Filed Sept. 9, 1955

INVENTOR.
ROBERT F. HOCHMAN
BY
ATTORNEY

3,032,869
METAL-CERAMIC SEAL

Robert Francis Hochman, Wonewoc, Wis., assignor to Minneapolis-Honeywell Regulator Company, Minneapolis, Minn., a corporation of Delaware
Original application Sept. 9, 1955, Ser. No. 533,340. Divided and this application July 28, 1960, Ser. No. 48,513
3 Claims. (Cl. 29—472.7)

The present invention is a division of my co-pending application entitled Metal to Ceramic Seal, filed September 9, 1955, Serial No. 533,340, now abandoned, and assigned to the same assignee as the present invention.

The present invention relates to improvements in metal coating for ceramic materials. More specifically, the invention relates to an improved metallic coating material which can be applied to a ceramic surface by fusion while in physical contact with the ceramic. This coating forms a tightly adherent layer against the ceramic which is free from defective areas and which therefore makes it particularly desirable as a metal-ceramic sealing composition.

It has previously been known to form metalized coating on ceramic bodies; however, these coatings are normally subject to certain limitations due particularly to a lack of adherence between the ceramic body and the metalized coating or cracking of the metal bonding structure. This lack of adherence and cracking of the metal bond itself is due at least in part to a lack of ductility in the metal coating substance. The lack of ductility and the normal difference in thermal expansion coefficients between the metal and the ceramic cause cracking to occur, particularly when these bodies are exposed to the relatively high temperatures which are encountered in a normal sealing operation. For example, a non-ductile metalized coating will tend to break away from the ceramic upon cooling after the firing cycle, or fractures may occur in the metal bond per se, thereby forming an imperfect seal or joint between the materials. For an application such as sealing a ceramic vacuum tube or the like, a perfect joint is required all along the ceramic surface. It has been found that a silver-titanium composition prepared in accordance with the present invention overcomes these difficulties and a highly adherent and ductile metallic coating may be formed on a ceramic base.

Heretofore, it has been difficult to obtain uniform homogeneous mixtures of silver and titanium. The two materials form an intermetallic compound including about 50% atomic Ag—50% atomic Ti. This compound is rather brittle and is not entirely satisfactory for ceramic sealing operations. Conventional methods of preparing homogeneous mixtures of this type normally fail due to the tendency of the titanium and the silver-titanium intermetallic compound to segregate from the mass.

It has now been found that by mixing a finely divided or powdered metal mixture of silver and titanium together thereby obtaining a homogeneous powder mixture, and then compressing the powder to a disk or slug form or the like, a highly satisfactory metallizing substance may be formed. The composition includes from 90-98% silver, with the balance consisting essentially of titanium. This material formed as above may be subsequently sintered and rolled in order to improve its mechanical characteristics. A section of this material is cut to size desired, and is placed in physical contact with a ceramic body and fused thereon, to form a smooth adherent layer of metal on the ceramic surface. These coatings are capable of withstanding relatively high temperatures as well as high temperature cycles, and therefore find particular utility in the electronics field for operations such as sealing for ceramic vacuum tubes and the like. This coating substance may also be used as an intermediate or soldering composition for bonding metallic bodies to ceramic bodies, such as, for example, bonding nickel or molybdenum or the like to ceramic. This silver-titanium ceramic adherent layer may be coated with a second metal such as, for example, aluminum or the like as desired, in order to provide a final brazing layer having a desirable melting or fusing temperature. In this manner the adherent layer may be used to provide a base for bonding of nickel, molybdenum, or like bodies to a ceramic base.

Therefore, it is an object of the present invention to provide an improved method of providing metalized coatings for ceramic bodies.

It is a further object of the present invention to provide a method of coating ceramic substances with silver and titanium.

It is a further object of the present invention to provide improved techniques utilizing powdered metallurgy to form homogeneous mixtures of silver and titanium.

It is yet another object of the present invention to provide a metallic ceramic coating composition which may be utilized as an intermediate substance for bonding or soldering objects to ceramic.

It is still a further object of the present invention to provide an improved sealing composition for ceramic bodies.

Figure 2:
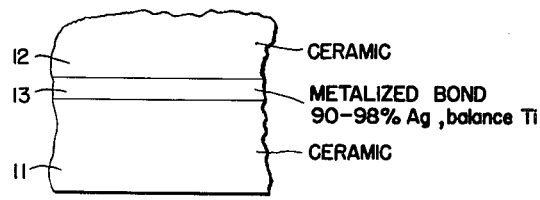
Figure 3:
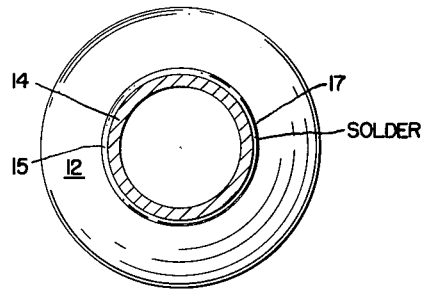

Other and further objects of the present invention will become apparent upon a study of the following specification and claims together with reference to the accompanying drawings wherein:

FIGURE 1 is an elevational view of a vacuum tube having a ceramic envelope and including a circumferential seal prepared in accordance with the present invention; and FIGURE 2 is a partial elevational view on a slightly enlarged scale of the device in FIGURE 1 showing the circumferential bond in greater detail; and FIGURE 3 is a horizontal sectional view taken along the lines and in the direction of the arrows 3—3 of FIGURE 1.

In accordance with the present invention, a mixture of powdered silver and titanium is prepared which comprises from about 90-98% silver, the balance titanium. Although compositions within this range have been found to be satisfactory, a range of from 2½-6% titanium has been found particularly useful in some sealing operations. The silver and titanium powder is thoroughly dispersed, and the raw powder compacted under a pressure ranging from 20,000 to 35,000 p.s.i. Although other pressures could be utilized, I have found that a relatively high compacting pressure such as in the range of 35,000 p.s.i. provides a more ductile finished product, while materials pressed under pressures below 20,000 p.s.i. are somewhat less desirable in this regard. The material may be used for sealing immediately after the mixing and compressing operation; however, it is generally desirable to sinter the mass before sealing is attempted. In this connection, sintering at a temperature of about 875° for a period of about 1½ hours has been found suitable. Temperatures ranging from 800–950° C. for suitable periods of time may actually be utilized in this regard. In carrying out the sealing operation, a disc, washer or other structure having the desired configuration is first cut, punched or otherwise formed from the pressed or sintered slug. This disc, washer, or the like is then fused at a temperature ranging from 950–1050° C. or higher while maintained in physical contact with the ceramic to be coated until sealing is accomplished. This sealing operation is advantageously carried out in an inert or inactive amosphere which may be vacuum, or the like.

A typical example or preparation of an article for sealing in accordance with the present invention will now be given.

Example

A mixture including 95% silver and 5% titanium in powdered form was prepared. The powder was blended and ballmilled, dry, for ½ hour. This powder was compressed into a physically sound pellet or slug, the slug being formed under a pressure of about 35,000 p.s.i. The compound slugs have a thickness of about 75 mils. The pressed material was then placed in a vacuum sintering furnace and heated to a temperature of 875° C. for a period of 1½ hours. The sintered slugs were rolled with intermediate anneals, until their thickness was reduced to about 6 mils. The rolled sheet was then finally annealed at a temperature of about 850° C. for about 1½ hours. A slug having the configuration desired in the seal was then punched from the prepared sheet, and the thus prepared slug was then maintained in contact with an alumina ceramic for the sealing operation. The final seal was prepared in an evacuated furnace using a temperature of 1,000° C. for a period of ½ hour this temperature being sufficient to fuse the Ag—Ti material. This coating was found to serve as an excellent medium for sealing of ceramic vacuum tubes such as shown in the accompanying drawings, and was found to be uniform throughout its extent.

Accordingly, in FIGURE 1 there is shown a vacuum tube 10 having a ceramic envelope including a base portion 11 and a cap portion 12 bonded circumferentially thereto by the metalized bond 13. The tube also includes a top anode portion 14 which is bonded on its outer periphery to the ceramic cap 12 by the metalized bonding layer 15. The tube of course, includes the conventional pins 16 which extend from the base 11 of the tube 10. In this device, the conventional internal component parts (not shown) of the vacuum tube 10 are preferably first mounted in place, and then the base portion 11 is sealed to the cap portion 12 by the metalized bond 13. The bonding material is, of course, prepared in accordance with the present invention, the details of which are set forth above. In the sealing operation, an annular ring of prepared alloyed material is cut to the desired size and placed in contact with the ceramic and the entire assembly is then fused in order to form the bond at 13. A similar metalized layer may also be formed on the inner portions of a port 17 at the top of the cap 12 in order that the anode assembly 14 may be attached to the cap. During formation of the bonds 13 and 15, the anode cap 14 is held against the silver-titanium layer slug and is thereby bonded to the metalized layer 15. The anode cap 14 is preferably made of molybdenum or nickel. In this manner, a highly adherent, non-porous bond was prepared between the metal and the ceramic utilizing the silver-titanium mixture of the present invention as an intermediate substance in the sealing. Therefore, tight seals are prepared in the form of metal-ceramic bonds or ceramic-metal-ceramic bonds which remain in such form even though the device may be subjected to relatively high temperature gradients during its operation.

It is normally not possible to obtain good seals when the composition of the coating mixture is substantially outside of the range 90–98% Ag, balance Ti. For example, the adherence of a mixture including less than 2% titanium is rather inferior while on the other hand, a mixture including more than 10% titanium is less ductile and more brittle than desired, and consequently more difficult to work and less likely to form a ductile bond with the ceramic.

Ceramics other than alumina ceramics such as other high temperature resistant ceramics or the like may be metalized with results substantially the same as those given in accordance with the example. It will be understood, therefore, that the example as given is for purposes of illustration only and is not intended to be construed as a limitation upon the scope of the present invention.

I claim:

1. The method of preparing an adherent metal coating for ceramic bodies which comprises mixing powdered silver and titanium in an amount ranging from 90–98% silver, balance essentially titanium, forming the powder mixture under pressure until the solid mass is formed, and then fusing said mass in physical contact with a ceramic body in an inert atmosphere until an adherent layer is obtained.

2. The method of forming a hermetic seal between a ceramic body and a further body which comprises mixing powdered silver and powdered titanium in an amount consisting essentially of from about 90% up to about 98% silver, balance titanium, sintering the mixture at from about 800° C. up to about 950° C. at a pressure in excess of 20,000 p.s.i. to form a cohesive member, forming said member into a shaped member of a configuration approximating the surfaces to be joined, placing said shaped member in a physical contact with said ceramic body and said further body, and fusing in an inert atmosphere said shaped member until an adherent, hermetic seal is formed between said ceramic body and said further body.

3. The method of forming a hermetic seal between a ceramic body and a further body which comprises mixing powdered silver and powdered titanium in an amount consisting essentially of from about 90% up to about 98% silver, balance titanium, sintering the mixture at about 875° C. and from about 35,000 p.s.i. pressure to form a cohesive member, forming said member into a shaped member of a configuration approximating surfaces to be joined, placing said shaped member in a physical contact with said ceramic body and said further body, and fusing in an inner atmosphere said shaped member at 1,000° C. to form a hermetic seal between said ceramic body and said further body.

References Cited in the file of this patent

UNITED STATES PATENTS

| | | |
|---|---|---|
| 2,686,958 | Eber et al. | Aug. 24, 1954 |
| 2,724,892 | Knochel et al. | Nov. 29, 1955 |
| 2,739,375 | Coxe | Mar. 27, 1956 |

OTHER REFERENCES

Bondley: "Metal-Ceramic Brazed Seals," Electronics, vol. 20, pages 97–99, July 1947.